Figure 1:
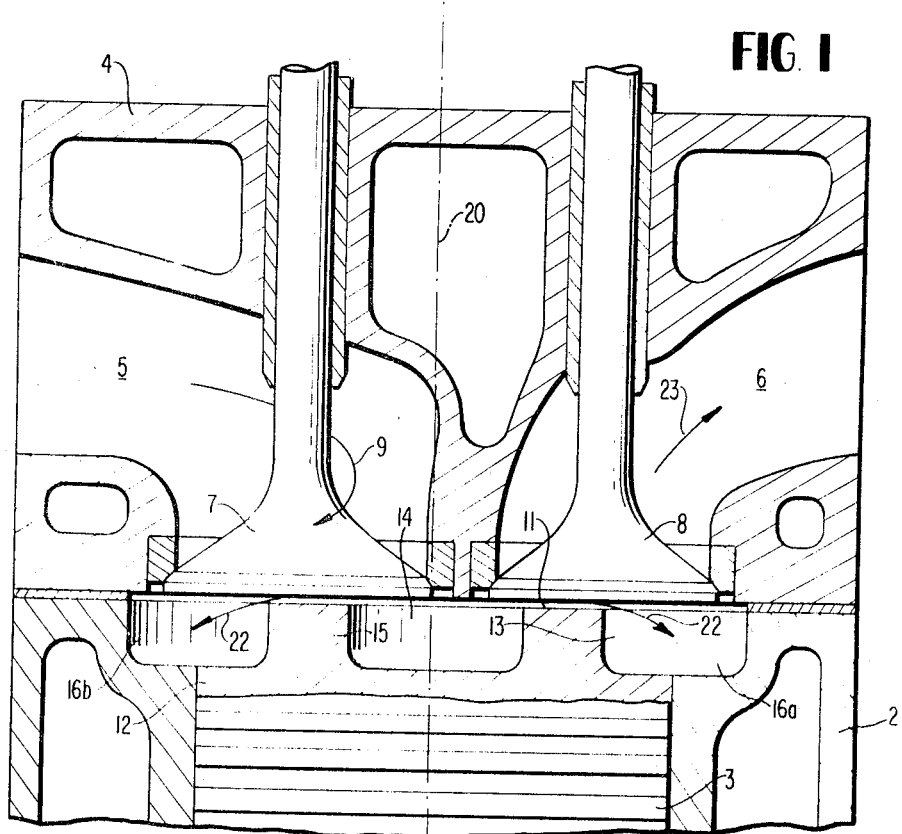

United States Patent
Winkler

[15] 3,658,046
[45] Apr. 25, 1972

[54] MIXTURE COMPRESSING INTERNAL COMBUSTION ENGINE WITH SWIRL INFLOW AND EXTERNAL IGNITION

[72] Inventor: Hermann Winkler, Oberesslingen, Germany

[73] Assignee: Daimler-Benz Aktiengesellschaft, Stuttgart-Unterturkheim, Germany

[22] Filed: Oct. 20, 1969

[21] Appl. No.: 867,792

[30] Foreign Application Priority Data

Oct. 24, 1968 Germany...................P 18 04 826.5

[52] U.S. Cl..........................123/32 ST, 123/32 B, 123/32 C, 123/32 SA, 123/DIG. 4
[51] Int. Cl............................F02b 9/10, F02b 19/08
[58] Field of Search.............123/32 B, 32 L, 32 ST, 32 SA, 123/32 SP, 193 P, 33, 188 I, 188 M, DIG. 4, 148 D, 148 DS

[56] References Cited

UNITED STATES PATENTS

| | | | |
|---|---|---|---|
| 996,378 | 6/1911 | Thomson | 123/188 |
| 1,292,241 | 1/1919 | Brinton | 123/148 |
| 2,157,764 | 5/1939 | Langrognet | 123/193 |
| 2,166,930 | 7/1939 | Gehres | 123/DIG. 4 |
| 2,815,014 | 12/1957 | Adams | 123/193 |
| 3,154,059 | 10/1964 | Witzky | 123/188 |
| 3,408,994 | 11/1968 | Kraus | 123/188 |

FOREIGN PATENTS OR APPLICATIONS

| | | | |
|---|---|---|---|
| 449,953 | 7/1936 | Great Britain | 123/32.2 |
| 248,071 | 3/1911 | Germany | 123/32.2 |
| 974,359 | 12/1960 | Germany | 123/32.2 |

*Primary Examiner*—Mark M. Newman
*Assistant Examiner*—Ronald B. Cox
*Attorney*—Craig, Antonelli and Hill

[57] ABSTRACT

A mixture-compressing internal combustion engine which operates with a mixture swirl and externally applied ignition of the mixture, particularly such an internal combustion engine as is controlled by valves, in which the working piston is offset along the outer circumference of its crown and within the area of its top land to form an annular combustion space while the ignition source is arranged in the cylinder head at a radially outer location of the annular combustion space.

20 Claims, 2 Drawing Figures

PATENTED APR 25 1972

3,658,046

INVENTOR
HERMANN WINKLER

BY
Craig, Antonelli, Stewart & Hill

ATTORNEYS

MIXTURE COMPRESSING INTERNAL COMBUSTION ENGINE WITH SWIRL INFLOW AND EXTERNAL IGNITION

The present invention relates to a mixture-compressing internal combustion engine with an eddying or rotating inflow and external or applied ignition of the mixture, especially to such an internal combustion engine as is valve-controlled.

The presently widely distributed view that the fuel-rich mixture with the types of internal combustion engine described above would be, after the rotating inflow, disposed in the center of the combustion space and would combust thereat, has not been confirmed on close examinations. High-speed photographs or motion pictures of combustion processes, instead, have indicated quite clearly that after a certain preparation period, a rich fuel-air mixture is present in the outer circumferential area of the combustion space and a lean fuel air mixture is present in the center thereof. Even though the combustion is adapted to be influenced by the combustion space form or shape, the spark plug location, the compression pressure, the temperature and the squeeze flows, the combustion nevertheless proceeds very orderly as a result of the swirling or rotating flow. The remaining of the rich mixture in the outer circumferential area of the combustion space might possibly be explained by the fact that the mixture at first includes not yet evaporated fuel particles, which are thrown or centrifuged toward the outside during the rotating or swirling inflow by the centrifugal force effective on the same.

The present invention aims above all to utilize the aforementioned recognition for the purpose of such a combustion space configuration and combustion arrangement of the type of internal combustion engine described above that a particularly favorable, especially a knock-free and ring-free combustion as well as a small fuel consumption with corresponding complete combustion and corresponding decontaminated exhaust gases results.

The underlying problems are solved by the present invention in that the working piston of the aforementioned type of internal combustion engine is offset, i.e. provided with a shoulder along the outer circumference of its top and simultaneously also within the area of its top land in the sense of the formation of an annular combustion space, and in that the ignition source is arranged in the cylinder head at a radially outer place of the annular combustion space with respect to the cylinder axis.

An intensive, annular flame results from such a combustion space construction in the annular combustion space, which counteracts a self-ignition with knock or ring-appearances and at the same time burns off the fuel film that has reached the cylinder walls, which assures a complete combustion of the fuel with corresponding low fuel consumption and corresponding decontaminated exhaust gases, i.e., exhaust gases free of toxic, harmful components.

According to one preferred construction of the present invention the working piston is provided, in addition to being provided with the annular combustion space, with a further central piston recess. This piston recess receives or accommodates during the compression stroke, the lean mixture component, not ignitable by itself, which is subsequently separated by the piston crown separating the two combustion spaces from one another, initially from the rich mixture component present in the annular combustion space. It is assured additionally by such a separation that only a rich fuel-air mixture, ready to ignite, is present in the annular combustion space at the moment of the ignition. Only about 10° to 20° after the top-dead-center position, when an intensive annular flame is already present in the annular combustion space, the lean mixture component present in the central piston recess is offered to the intensive annular flame, which lean mixture component is now also completely combusted by reason of the already existing high temperature. As a result thereof, an especially effective layer charge is achieved at the same time which, as is known, serves the attainment of particularly favorable fuel consumptions.

According to a further also preferred construction of the present invention, the annular combustion space is enlarged radially outwardly relative to the cylinder axis at the places of the valve discs projecting beyond the piston cross-section by two oppositely disposed recesses of the working cylinder. Such a configuration of the annular combustion chamber makes possible in a simple manner the simultaneous accommodation of large valve cross-sections, corresponding low flow losses and a corresponding favorable filling.

According to a still further feature and development of the present invention, the two recesses are combined by way of radial, narrower recess portions of the working cylinder, into an elliptical annular space offset outwardly with respect to the cylinder bore and outwardly adjoining the annular combustion space of the working piston in the top-dead-center position of the working piston. As a result of such an enlargement of the annular combustion space, a far-reachingly uniform curvature, favorable from a flow point of view, of the radially outer boundary wall of the annular combustion space is assured thereby.

According to still another feature of the present invention, the axial plane of the working cylinder extending in the direction of the two recesses, is at the same time a transverse plane of an in-line engine, whence it is assured that this in-line engine, notwithstanding the provided recesses of the working cylinder, can be made with a minimum cylinder spacing and corresponding short structural length as well as low structural weight.

According to a still further feature and development of the present invention, the internal combustion engine is provided with two spark plugs per working cylinder, which are arranged diametrically opposite to the cylinder axis, possibly in an axial plane that is offset with respect to the axial plane accommodating the two recesses by about 35° to 45° opposite the direction of rotation or swirl of the inflowing mixture. Whereas the aforementioned arrangement of two spark plugs is already advantageous as such in principle especially when, for example, for the avoidance of a larger energy expenditure for the production of the swirl, one has to operate with a relatively low swirling or rotating velocity, it is particularly advantageous in the case of the external enlargement of the annular combustion space by the two aforementioned recess of the working cylinder because the spark plugs in the proposed arrangement are each within the deceleration area of the swirl or rotating flow, where one may count on a corresponding precipitation of the fuel and on a corresponding enrichment of the mixture. Hence, if the mixture is so adjusted that a sufficiently rich mixture is just still assured at the places of the two spark plugs, then there results the possibility of a still more lean operation of the internal combustion engine.

Accordingly, it is an object of the present invention to provide a mixture-compressing internal combustion engine of the type described above which avoids by simple means the aforementioned shortcomings and drawbacks encountered in the prior art.

Another object of the present invention resides in a mixture-compressing internal combustion engine with rotating inflow and externally applied ignition which assures a particularly favorable combustion accompanied with relatively low fuel consumption and relatively non-toxic exhaust gases.

Still a further object of the present invention resides in an internal combustion engine of the type described above in which the auto-ignition as well as poisonous exhaust gases are effectively counteracted by the particular construction of the combustion space.

Still a further object of the present invention resides in an internal combustion engine of the type described above which not only assures favorable filling and combustion conditions but additionally permits the construction of the engine with small structural length and low structural weight.

Figure 2:
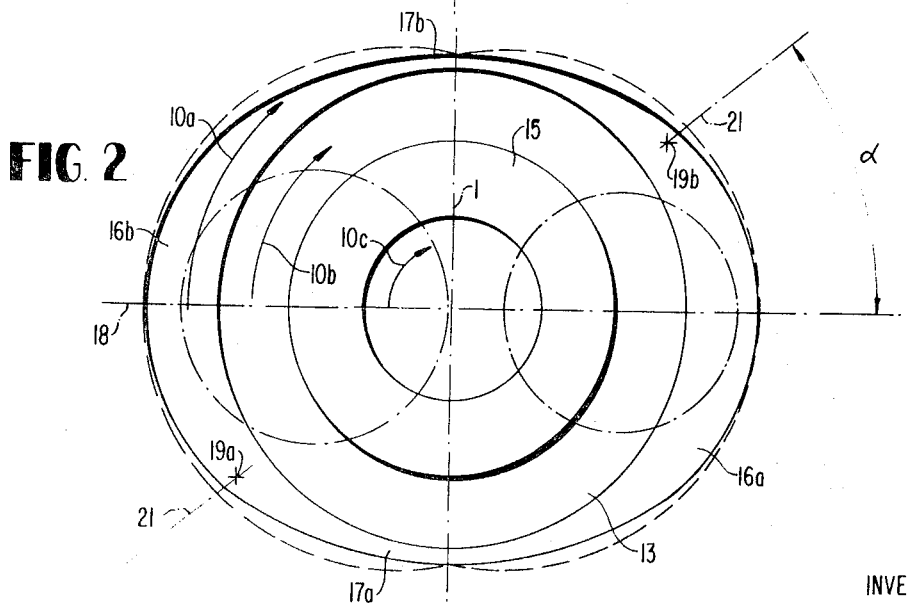

These and further objects, features and advantages of the present invention will become more obvious from the following description when taken in connection with the accompanying drawing which shows for purposes of illustration only, one embodiment in accordance with the present invention and wherein FIG. 1 is a partial axial cross-sectional view through a working cylinder of an internal combustion engine according to the present invention and illustrating the combustion chamber arrangement thereof, and FIG. 2 is a top plan view of the working piston with axial combustion space and annular combustion space of the internal combustion engine according to FIG. 1.

Referring now to the drawing wherein like reference numerals are used throughout the two views to designate like parts, the internal combustion engine illustrated in these two figures is constructed as in-line engine whose longitudinal axis 1 is visible from FIG. 2. A working piston 3, reciprocatingly driven in a conventional manner (not illustrated), is arranged in each working cylinder 2 of the engine, while the cylinder 2 is closed off by a conventional cylinder head 4, in which are located a valve controlled inlet channel 5 and a valve-controlled outlet or exhaust channel 6. As can be seen, the valve discs 7 and 8 of the inlet and outlet valves project slightly beyond the piston cross-section.

The internal combustion engine is constructed as mixture-intaking engine whereby the mixture is produced in known manner (not illustrated) either by means of one or several carburetors or by means of fuel injection either into the suction pipe or still possibly also into the working cylinder during the suction stroke of the working piston. The inlet channel 5 is constructed in a conventional manner as swirl channel, i.e. as a channel producing a rotation or swirl of the inflowing mixture as it enters the cylinder, by means of which a rotating movement in the direction of the arrow 9 of FIG. 1 and of the arrows 10a, 10b, and 10c of FIG. 2 is imparted to the mixture flowing into the working cylinder 2.

The working piston 3 is offset along the outer circumference of its top 11 and simultaneously within the area of its top lane 12 in the sense of the formation of an annular combustion space 13. Additionally, the working piston 3 is further provided with an axial piston recess 14 which is separated from the annular combustion space 13 by annularly shaped piston crown 15.

At the places of the valve discs 7 and 8 projecting beyond the piston cross-section, the annular combustion space 13 is enlarged radially outwardly thereof with respect to the cylinder axis by two oppositely disposed recesses 16a and 16b of the working cylinder 2, and the two recesses 16a and 16b are combined by way of radially narrower recess portions 17a and 17b of the working cylinder 2 into an elliptical annular combustion space, offset in the outward direction with respect to the cylinder bore and outwardly adjoining in the top-dead-center position of the working piston 3 the annular combustion space 13 thereof.

The axial plane 18 extending in the direction of the two recesses 16a and 16b of the working cylinder 2 is at the same time a cross plane of the in-line engine, whose cylinder row, as a rule, consists of a corresponding conventional cylinder block. As to the rest, the internal combustion engine is provided with two spark plugs 19a and 19b per working cylinder 2 which are arranged diametrically opposite relative to the cylinder axis 20 (FIG. 1) and in an axial plane 21 which is displaced from the axial plane 18 extending in the direction of the two recesses 16a, 16b by an angle $\alpha$ of about 38° in the direction opposite the direction of rotating of the inflowing mixture. The two spark plugs 19a and 19b are thereby arranged in the cylinder head 2 at radially outer places of the aforementioned recesses.

During the operation of the described internal combustion engine the mixture flows through the inlet channel 5 in the direction of the arrow 9 and into the working cylinder 2 as a swirling flow rotating in the direction of the arrows 10a, 10b and 10c. Owing to the rotation, a certain dissociation or separation of the mixture results, whereupon a rich, readily ignitable mixture component is disposed in proximity to the cylinder wall and a lean mixture component in the axial area of the cylinder. During the ensuing compression stroke, the annularly shaped piston crown 15 effects an increasing separation of the two mixture components, of which in the area of the top-dead-center position of the working piston 3 illustrated in FIG. 1, the lean mixture component is disposed in the piston recess 14 and the rich, readily ignitable mixture component in the annular compression space 13, which is now enlarged by the recesses 16a, 16b and 17a, 17b of the working cylinder 2 into an elliptical combustion space. A radially outwardly directed squeeze flow, which is indicated in FIG. 1 by arrows 22, is superimposed on the rotating swirling movement of the rich mixture at the end of the compression stroke of the working piston. The rich mixture rotating in the enlarged annular combustion space, receives or is subjected in each case to a deceleration due to the cross-sectional enlargement realized within the areas of the spark plugs 19a and 19b, which leads to a fuel separation and corresponding mixture enrichment thereat. It is therefore possible to adjust the average fuel component of the mixture flowing in the enlarged annular combustion space more lean than is necessary for the reliable ignition at the spark plugs 19a and 19b.

After the ignition an intensive annular flame forms in the enlarged annular combustion space, which not only counteracts the self-ignition but takes care for an effective combustion of the fuel film that has reached the cylinder walls. A very complete combustion of the fuel, a low fuel consumption and a favorable decontamination of the exhaust gases is achieved accordingly.

In a piston position of about 10° to 20° after top-dead-center position, the lean mixture component from the piston recess 14 is presented or offered to the annular flame, which lean mixture component is now also completely combusted by reason of the considerably increased temperature. The exhaust gases leave the working cylinder 2 at the end of the expansion stroke (with opened exhaust valve) in the direction of the arrow 23 of FIG. 1.

While I have shown and described only one embodiment in accordance with the present invention, it is understood that the same is not limited thereto but is susceptible of numerous changes and modifications as known to those skilled in the art. Thus, for example, the angle $\alpha$ between the axial plane 21 including two spark plugs 19a and 19b and the axial plane 18 extending transversely to the in-line engine may, instead of being 38°, also lie within the angular range between about 35° to 40°. The optimum valve for the piston recess volume is to be determined empirically for a given internal combustion engine by corresponding tests. It is even feasible that in case of omission of the piston recess 14 and with a plane or flat cylinder head top side, such an intensive squeeze flow takes place in the direction toward the outwardly disposed enlarged annular combustion space that already as a result thereof, the aforementioned advantageous combustion results are far-reachingly achieved. Furthermore, the additional recesses 16a, 16b and 17a, 17b of the working cylinder 2 may be dispensed with altogether, and the annular combustion space 13 could also be arranged offset to the cylinder axis 20. Finally, the control of the internal combustion engine may also take place in a manner different from that with the use of valves, without in any way affecting the scope of the present invention.

Thus, it is obvious that the present invention is not limited to the details shown and described herein and I therefore do not wish to be limited to these details but intend to cover all such changes and modifications as are within the scope of those skilled in the art.

I claim:

1. A mixture-compressing internal combustion engine with cylinder walls, with a cylinder head and with rotating inflow and external ignition of the mixture, characterized in that each cylinder includes a working piston which is offset along the outer circumference of its top and also within the area of its top land to form with the cylinder walls and the cylinder head a combustion space endless in the peripheral direction thereof, and ignition means arranged in the cylinder head within the radially outer area of said endless combustion space with respect to the cylinder axis.

2. An internal combustion engine according to claim 1, characterized by valve control means for the internal combustion engine.

3. An internal combustion engine according to claim 1, characterized in that the working piston, in addition to the endless combustion space, is provided with an essentially axial piston recess means.

4. An internal combustion engine according to claim 2, characterized in that the endless combustion space is enlarged radially outwardly thereof at the places of valve discs projecting beyond the piston cross-section by two substantially oppositely disposed recess means of the working cylinder.

5. An internal combustion engine according to claim 4, characterized in that the two recess means are combined by way of radially narrower recess portions of the working cylinder into an approximately elliptical endless space, offset outwardly with respect to the cylinder bore and, in the top-dead-center position of the working piston, outwardly adjoining the endless combustion space thereof.

6. An internal combustion engine according to claim 5, characterized in that the axial plane extending in the direction of the two recess means of the working cylinder is at the same time a cross plane of an in-line engine.

7. An internal combustion engine according to claim 6, characterized in that the working cylinder is provided with two ignition means which are arranged substantially diametrically opposite to the cylinder axis.

8. An internal combustion engine according to claim 7, characterized in that the two ignition means are arranged in an axial plane which is displaced with respect to axial plane extending through the two recess means by about 35° to 45° opposite the direction of rotation of the inflowing mixture.

9. An internal combustion engine according to claim 8, characterized in that the working piston, in addition to the endless combustion space, is provided with an essentially axial piston recess means.

10. An internal combustion engine according to claim 4, characterized in that the axial plane extending in the direction of the two recess means of the working cylinder is at the same time a cross plane of an in-line engine.

11. An internal combustion engine according to claim 10, characterized in that the working cylinder is provided with two ignition means which are arranged substantially diametrically opposite to the cylinder axis.

12. An internal combustion engine according to claim 11, characterized in that two ignition means are arranged in an axial plane which is displaced with respect to axial plane extending through the two recess means by about 35° to 45° opposite the direction of rotation of the inflowing mixture.

13. An internal combustion engine according to claim 1 characterized in that the working cylinder is provided with two ignition means which are arranged substantially diametrically opposite to the cylinder axis.

14. An internal combustion engine with a longitudinal axis according to claim 13, characterized in that the two ignition means are arranged in an axial plane which is displaced with respect to an axial plane extending transversely to said longitudinal axis by about 35° to 45° opposite the direction of rotation of the inflowing mixture.

15. A mixture-compressing internal combustion engine with cylinder wall means, with a cylinder head and with a rotating inflow of a fuel-air mixture and external ignition of the mixture within a combustion chamber, comprising at least one cylinder means including one working piston means therewithin, said piston means being provided with offset means along the outer circumference of its top to form with the cylinder wall means and the cylinder head a combustion space endless in the peripheral direction thereof, the portion of the top of the piston means adjacent the offset means which delimits the combustion space radially inwardly thereof, closely approaching the bottom surface of a cylinder head means so as to substantially close off said endless combustion space in the radially inward direction with respect to the cylinder axis, and ignition means for the fuel mixture in said endless combustion space, said ignition means being located in the cylinder head means within the radially outer area of said endless combustion space with respect to the cylinder axis.

16. A mixture-compression internal combustion engine according to claim 15, characterized in that the endless combustion space is enlarged in the radially outward direction so as to extend beyond the contours of the piston cross-section to provide two substantially oppositely disposed recess means.

17. A mixture-compressing internal combustion engine according to claim 16, characterized in that the two recess means are combined by way of radially narrower recess portions provided in the cylinder means so as to form an approximately elliptical endless space, offset outwardly with respect to the cylinder bore, said elliptical endless space adjoining the endless combustion space formed by said piston means in the top dead center position of the latter.

18. A mixture-compressing internal combustion engine of in-line construction, according to claim 16 characterized in that an axial plane extending in the direction of the two recess means is disposed substantially transversely to the in-line engine.

19. A mixture-compressing internal combustion engine according to claim 16, characterized in that two ignition means are provided in the cylinder head means, one ignition means each being located within the area of a respective recess means.

20. A mixture-compressing internal combustion engine according to claim 15, characterized in that the piston means is provided with a piston recess means within the axial area thereof, said piston recess means being substantially separated from said endless combustion space by said piston top portion in the top dead center position of the piston means.

* * * * *